United States Patent
Jeong et al.

(10) Patent No.: US 10,347,917 B2
(45) Date of Patent: Jul. 9, 2019

(54) METHOD FOR MANUFACTURING POSITIVE ACTIVE MATERIAL FOR ALL-SOLID LITHIUM-SULFUR BATTERY

(71) Applicants: HYUNDAI MOTOR COMPANY, Seoul (KR); Industry-University Cooperation Foundation Hanyang University, Seoul (KR)

(72) Inventors: Kyoung Jin Jeong, Seoul (KR); Min Yong Eom, Seoul (KR); Chan Hwi Park, Seoul (KR); Dong Wook Shin, Seongnam-si (KR)

(73) Assignees: Hyundai Motor Company, Seoul (KR); Industry-University Cooperation Foundation Hanyang University, Seoul (KR)

( * ) Notice: Subject to any disclaimer, the term of this patent is extended or adjusted under 35 U.S.C. 154(b) by 120 days.

(21) Appl. No.: 14/966,624

(22) Filed: Dec. 11, 2015

(65) Prior Publication Data
US 2016/0268600 A1   Sep. 15, 2016

(30) Foreign Application Priority Data

Mar. 13, 2015   (KR) .......................... 10-2015-0035121

(51) Int. Cl.
*H01M 4/62* (2006.01)
*H01M 4/00* (2006.01)
(Continued)

(52) U.S. Cl.
CPC ......... *H01M 4/625* (2013.01); *H01M 4/0471* (2013.01); *H01M 4/1397* (2013.01);
(Continued)

(58) Field of Classification Search
CPC .. H01M 4/625; H01M 4/0471; H01M 4/1397; H01M 4/364; H01M 4/5815; H01M 10/052; Y02E 60/122; Y02T 10/7011
(Continued)

(56) References Cited

U.S. PATENT DOCUMENTS

| | | | | |
|---|---|---|---|---|
| 2011/0052998 | A1* | 3/2011 | Liang | C01B 31/12 429/300 |
| 2013/0202961 | A1* | 8/2013 | Hagen | H01M 4/0404 429/211 |

FOREIGN PATENT DOCUMENTS

| | | |
|---|---|---|
| JP | 5419020 B2 | 2/2014 |
| KR | 10-2001-0096191 A | 11/2001 |

(Continued)

OTHER PUBLICATIONS

Wu, F. et al. "Nanoporous Li2S and MWCNT-linked Li2S powder cathodes for lithium-sulfur and lithium-ion battery chemistries". Journal of Materials Chemistry A. 2014. vol. 2. pp. 6064-6070.
(Continued)

*Primary Examiner* — Harold Y Pyon
*Assistant Examiner* — Danny N Kang
(74) *Attorney, Agent, or Firm* — Morgan, Lewis & Bockius LLP (57) ABSTRACT

A method for manufacturing a positive active material for an all-solid Lithium-Sulfur battery includes preparing a lithium sulfide solution by dissolving lithium sulfide in anhydrous ethanol. A mixture is prepared by mixing a carbon fiber to the lithium sulfide solution. A lithium sulfide-carbon fiber composite is prepared by drying the mixture of the carbon fiber and the lithium sulfide solution to deposit the lithium sulfide on a surface of the carbon fiber. The lithium sulfide-carbon fiber composite is heated at 400 to 600° C.

5 Claims, 7 Drawing Sheets

(51) Int. Cl.
*H01M 10/052* (2010.01)
*H01M 4/04* (2006.01)
*H01M 4/1397* (2010.01)
*H01M 4/36* (2006.01)
*H01M 4/58* (2010.01)

(52) U.S. Cl.
CPC ......... *H01M 4/364* (2013.01); *H01M 4/5815* (2013.01); *H01M 10/052* (2013.01)

(58) Field of Classification Search
USPC ........................................................ 252/500
See application file for complete search history.

(56) References Cited

FOREIGN PATENT DOCUMENTS

| KR | 10-2006-0117109 A | 11/2006 |
| KR | 10-2011-0134793 A | 12/2011 |
| KR | 10-2012-0051549 A | 5/2012 |
| KR | 10-2013-0029330 A | 3/2013 |

OTHER PUBLICATIONS

Wu, F. et al. "Solution-Based Processing of Graphene-Li2S Composite Cathodes for Lithium-Ion and Lithium-Sulfur Batteries". Particle & Particle Systems Characterization. 2014. vol. 31. pp. 639-644.
Wu, F. et al. "Harnessing Steric Separation of Freshly Nucleated Li2S Nanoparticles for Bottom-Up Assembly of High-Performanc Cathodes for Lithium-Sulfur and Lithium-Ion Batteries". Advanced Energy Materials. 2014.

* cited by examiner

FIG. 7

METHOD FOR MANUFACTURING POSITIVE ACTIVE MATERIAL FOR ALL-SOLID LITHIUM-SULFUR BATTERY

CROSS-REFERENCE TO RELATED APPLICATION

This application claims under 35 U.S.C. § 119(a) the benefit of priority to Korean Patent Application No. 10-2015-0035121 filed on Mar. 13, 2015, the entire content of which is incorporated herein by reference.

TECHNICAL FIELD

The present disclosure relates to a method for manufacturing a positive active material for an all-solid Lithium-Sulfur battery. More particularly, the present disclosure relates to a method for manufacturing a positive active material for an all-solid Lithium-Sulfur battery, which can increase a contact area of the positive active material and an electrolyte and can relieve influence to prepare a lithium sulfide-carbon fiber composite, and to make the lithium sulfide have nano size.

BACKGROUND

A rechargeable secondary battery has been widely used as a large power storage battery for an electric car or a power storage system and a compact, high performance energy source of a portable electronic device such as a mobile phone, a camcorder, and a notebook.

A lithium ion battery as a secondary battery has an advantage of having higher energy density and larger capacity per unit area than a nickel-manganese battery or a nickel-cadmium battery.

However, the lithium ion battery as a next-generation electric car battery has a stability problem by overheating, low energy density of about 360 Wh/kg, low output and the like.

In order to overcome these problems of the lithium ion battery, research and developments for an all-solid Lithium-Sulfur battery and the like, which can embody high output and high energy density, have been actively proceeding.

The all-solid Lithium-Sulfur battery uses sulfur as a positive active material and lithium metal as a negative electrode, and has a theoretical energy density of about 2600 Wh/kg, which is about 7 times higher than the existing lithium ion battery. Thus, it is suitable for a power supply for an electric car.

Further, the all-solid Lithium-Sulfur battery prevents life time characteristic reduction caused by the Lithium-Sulfur compound dissolved in liquid electrolyte, and leaking of the liquid electrolyte and fire at high temperature, as compared to the lithium-sulfur battery using the liquid electrolyte.

However, a volume of the sulfur electrode (positive electrode) changes about 180% as the all-solid Lithium-Sulfur battery being charged and discharged. Thus, there is no contact between the positive active material and the electrolyte, thereby capacity characteristic and life time characteristic decrease.

The existing secondary battery uses nano-sized silicon as a negative material and the like to prevent life time reduction according to the volume change during charging and discharging.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to solve the above-described problems associated with the prior art.

An aspect of the present inventive concept provides a method for manufacturing a positive active material for an all-solid Lithium-Sulfur battery, which relieve the influence by volume change of the battery during charging and discharging by reducing the size of the active material.

Another aspect of the present inventive concept provides a method for manufacturing a positive active material for an all-solid Lithium-Sulfur battery, which can increase battery capacity by improving contact characteristic between a conductive material and the active material.

The object of the present disclosure is not limited to the above-described object, and other objects of the present disclosure that have not been described will be clearly understood by the following description.

To achieve the above objects, the present disclosure includes the following constituents.

According to an embodiment of the present inventive concept, a method for manufacturing a positive active material for an all-solid Lithium-Sulfur battery comprises preparing a lithium sulfide solution by dissolving lithium sulfide in anhydrous ethanol. A mixture is prepared by mixing a carbon fiber to the lithium sulfide solution. A lithium sulfide-carbon fiber composite is prepared by drying the mixture to deposit the lithium sulfide on the surface of the carbon fiber. The lithium sulfide-carbon fiber composite is heated at 400 to 600° C.

The heating may be conducted at 500° C.

A size of the lithium sulfide in the lithium sulfide-carbon fiber composite after heating may be 70 to 100 nm.

The drying may be conducted by a vacuum drying method.

The method may further comprise mixing a conductive material to the lithium sulfide-carbon fiber composite.

A mixing ratio of the lithium sulfide:the carbon fiber:the conductive material may be 1:0.2:0.2.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, Embodiments of the present inventive concept will be described in detail. However, the embodiments of the present inventive concept may be modified in various ways, and the scope of the present disclosure should not be interpreted as being limited to the examples. The embodiments of the present inventive concept are provided just for explaining the present disclosure in detail to those having ordinary skill in the art.

Further, if it is determined that detailed description of known functions or constructions may unnecessarily obscure the gist of the present disclosure, the detailed description thereof will be omitted. Unless explicitly stated to the contrary, the word "comprise," "comprises" or "comprising" used throughout the specification will not be understood as the exclusion of the other elements but to imply the inclusion of the other elements.

A method for manufacturing a positive active material for an all-solid Lithium-Sulfur battery according to the present disclosure may comprise: (1) preparing a lithium sulfide solution by dissolving lithium sulfide ($Li_2S$) in anhydrous ethanol; (2) preparing a mixture by mixing a carbon fiber to the lithium sulfide solution; (3) preparing a lithium sulfide-carbon fiber composite by drying the mixture to deposit the lithium sulfide on the surface of the carbon fiber; and (4) heating the lithium sulfide-carbon fiber composite at 400 to 600° C.

Conventionally, a mechanical powder grinding process was mainly applied in order to reduce a size of the lithium sulfide. The present disclosure has technical characteristics of making the lithium sulfide-carbon fiber composite by dissolving the lithium sulfide and then depositing thereof again, and phase transitioning thereof to a nano-sized crystal form by heating the amorphous lithium sulfide at a proper temperature. Thus, according to the present disclosure, a positive active material for an all-solid Lithium-Sulfur battery having excellent performance can be manufactured because it has higher yield for the lithium sulfide than the conventional material, and it can be evenly formed on the carbon fiber.

The present disclosure may apply a drying process for deposition of the lithium sulfide caused by evaporation of the anhydrous ethanol in step (3). Here, a natural drying method is too slow for drying, and a heat-drying method in a glove box may cause contamination, coating of the carbon ingredient of the anhydrous ethanol on the active material, and the like. In the present disclosure, a vacuum drying method is used for efficient evaporation of the anhydrous ethanol without impurities.

The carbon fiber may be a vapor-grown carbon fiber (VGCF), a carbon nanotube (CNT), and the like, but not limited thereto.

The method for manufacturing a positive active material according to the present disclosure may comprise mixing the conductive material to the positive active material manufactured through step (4).

The conductive material may be Ketjen black, Acetylene black, Super P, and the like, but not limited thereto.

Since the sulfur has very low electronic conductivity, it may be properly mixed with the conductive material to improve conductivity.

In the present disclosure, the carbon fiber which is in line-contact with the lithium sulfide and the conductive material which is in point-contact with the lithium sulfide, are mixed, thereby enabling both the line-contact and the point-contact. Thus, charging and discharging capacity can be further improved by maximizing conductivity because resistance is low during electron movement.

EXAMPLES

The following examples illustrate the present disclosure and are not intended to limit the same.

Example 1—All-Solid Lithium-Sulfur Battery Manufactured by Changing Heating Temperature of Lithium Sulfide-Carbon Fiber Composite (1) A 2 M lithium sulfide solution was prepared by dissolving lithium sulfide in anhydrous ethanol. A mixture was prepared by mixing a carbon fiber to the lithium sulfide solution at the ratio of the following Table 1. A lithium sulfide-carbon fiber composite was manufactured by evaporating the anhydrous ethanol from the mixture using a vacuum drying device, so as to deposit the lithium sulfide on the carbon fiber.

(2) A positive active material was manufactured by heating the lithium sulfide-carbon fiber composite at 300, 400, 500, 600, and 700° C., respectively.

(3) A positive electrode was prepared by mixing solid electrolyte and a conductive material to the positive active material at the ratio of the following Table 1, and then an all-solid Lithium-Sulfur battery was manufactured using lithium metal as a negative electrode. Here, VGCF was used as the carbon fiber, Ketjen black was used as the conductive material, and $Li_2S$—$P_2S_5$ was used as the solid electrolyte.

TABLE 1

| Item | Positive Electrode | | | | Negative Electrode |
|---|---|---|---|---|---|
| | Lithium Sulfide | Carbon Fiber | Conductive Material | Solid Electrolyte | |
| Ratio | 1 | 0.2 | 0.2 | 2 | Lithium Metal |
| Total Weight | | | 15 mg | | |

Figure 1:
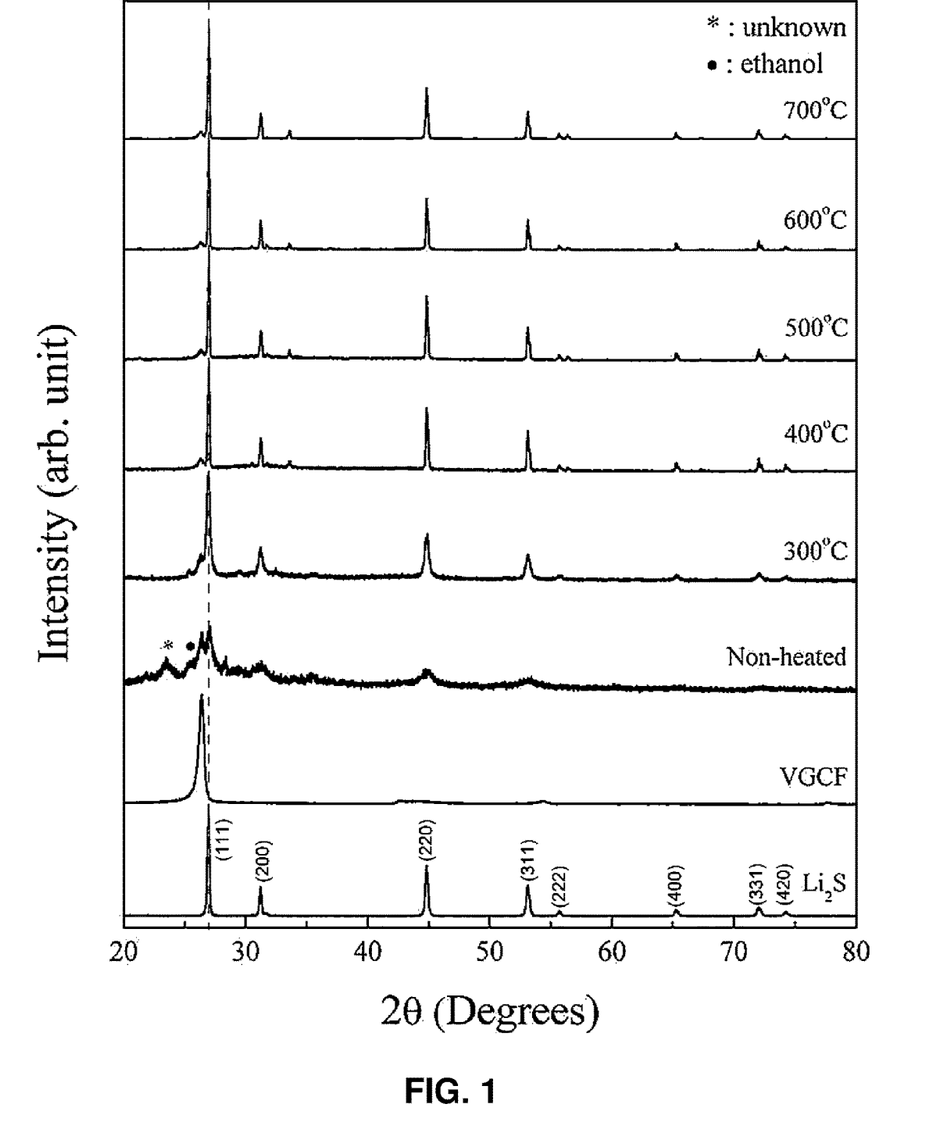
FIG. 1 shows an X-ray diffraction pattern of a positive active material manufactured in Example 1.

Measuring Example 1—Measurement of X-Ray Diffraction of Positive Active Material Depending on Heating Temperature FIG. 1 shows an X-ray diffraction pattern of the positive active material manufactured in Example 1.

Referring to FIG. 1, it can be confirmed that the lithium sulfide, which was in amorphous state before heating (Non-heated), was phase transitioned to a crystal form after heating. Further, as peaks of the X-ray diffraction pattern of the heated positive active material was measured, it can be found that other impurities were not generated during the heating process.

Figure 2:
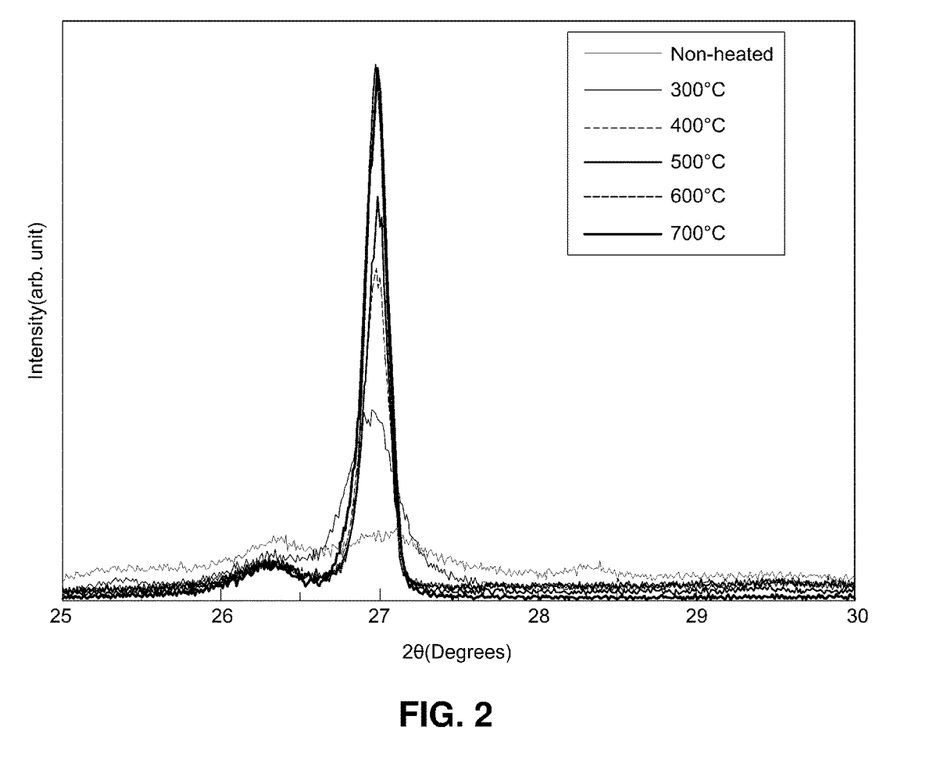
FIG. 2 shows an X-ray diffraction pattern when 2θ in FIG. 1 is 27 degree.
Figure 3:
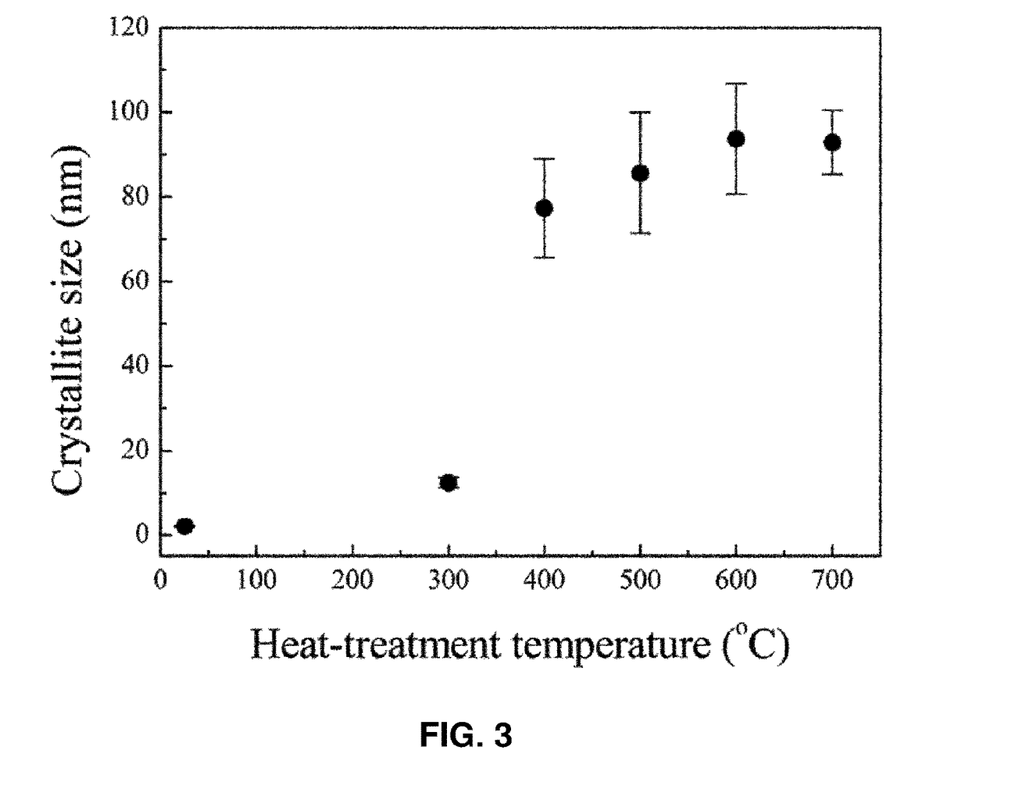
FIG. 3 shows size values of a lithium sulfide powder of a positive active material manufactured in Example 1 calculated using the X-ray diffraction pattern of FIG. 2 and Scherrer's equation.

FIG. 2 shows an X-ray diffraction pattern when 2θ in FIG. 1 is 27 degree, and FIG. 3 shows size values of the lithium sulfide powder of each specimen calculated by using the X-ray diffraction pattern of FIG. 2 and Scherrer's equation.

The result of calculating the powder size of the lithium sulfide with reference to FIG. 3 is shown in Table 2.

TABLE 2

| | Heating Temperature | | | | | |
|---|---|---|---|---|---|---|
| | Non-Heated | 300° C. | 400° C. | 500° C. | 600° C. | 700° C. |
| Powder Size | 2.06 nm | 12.37 nm | 77.35 nm | 85.62 nm | 93.68 nm | 92.83 nm |

According to the present disclosure, the positive active material, wherein the nano-sized lithium sulfide is deposited on the carbon fiber, can be manufactured through dissolving, depositing, and heating the lithium sulfide. Accordingly, the contact area of the positive active material to the electrolyte increases, thereby improving charging and discharging capacity of the battery.

The nano-sized lithium sulfide may have particle size of 70 to 100 nm, or more specifically 80 to 85 nm since with the said particle size, the above-described effects are obtained because the sulfur can smoothly function as an active material in a battery, and the influence by a volume change of the active material generated in the battery is relieved.

Figure 4:
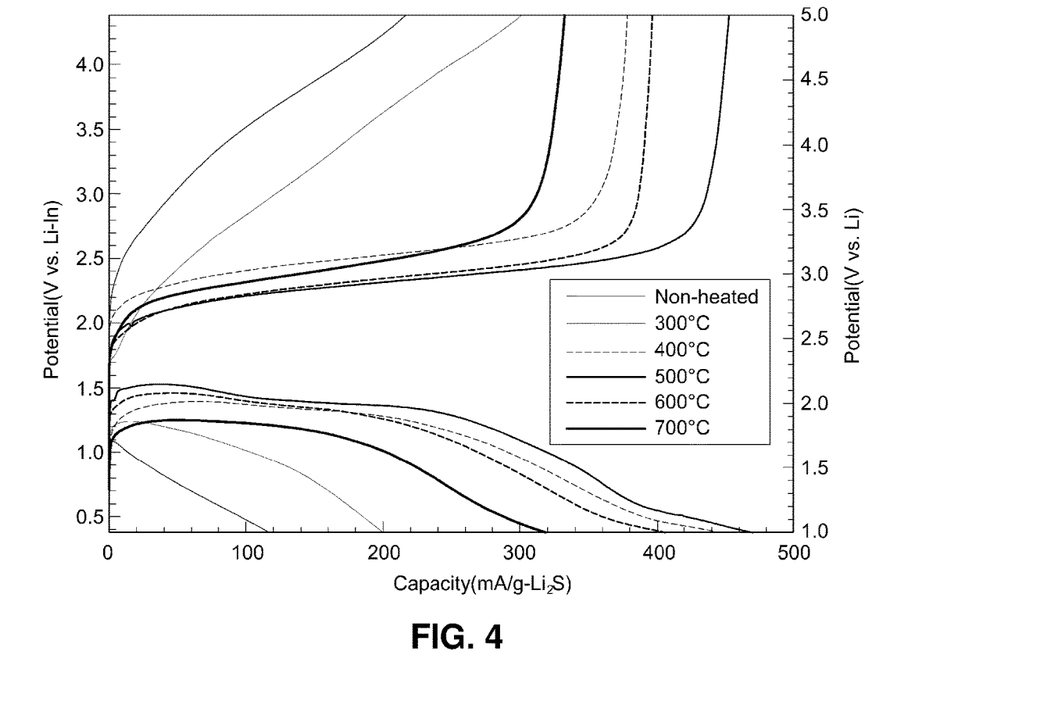
FIG. 4 shows measurement data of initial charging and discharging capacity of an all-solid Lithium-Sulfur battery manufactured in Example 1.

Measuring Example 2—Measurement of Initial Charging and Discharging Characteristics of All-Solid Lithium-Sulfur Battery Manufactured with Positive Active Material Manufactured by Changing Heating Temperature FIG. 4 shows measurement data of initial charging and discharging capacity of each all-solid Lithium-Sulfur battery manufactured in Example 1, and measured value of charging and discharging capacity of each battery are as shown in the following Table 3.

TABLE 3

| | Non-Heated | 300° C. | 400° C. | 500° C. | 600° C. | 700° C. |
|---|---|---|---|---|---|---|
| When Charging [mAh/g] | 301 | 382 | 379 | 452 | 397 | 333 |
| When Discharging [mAh/g] | 199 | 238 | 446 | 469 | 406 | 318 |

Referring to Table 3, the all-solid Lithium-Sulfur battery, which is manufactured by using the positive active material heated at 400 to 600° C., shows significantly improved initial charging and discharging capacity, as compared to a non-heated battery. Thus, in the present disclosure, the step of heating the lithium sulfide-carbon fiber composite may be conducted at 400 to 600° C., or more specifically at 500° C.

Measuring Example 3—Measurement of Life Time Characteristic of All-Solid Lithium-Sulfur Battery Manufactured with Positive Active Material Manufactured by Heating at 500° C.

Figure 5:
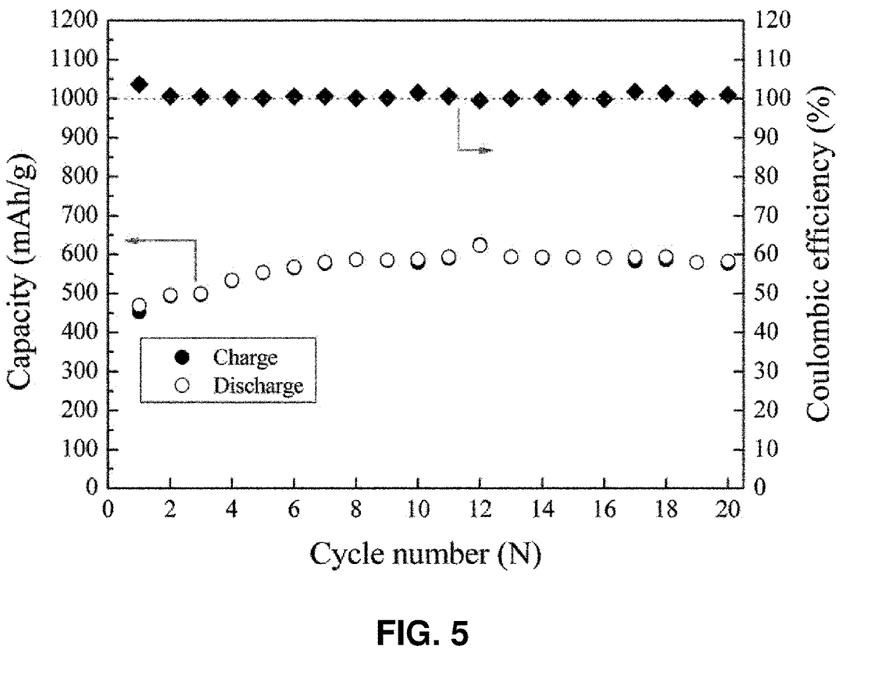
FIG. 5 shows measurement data of charging and discharging capacity up to $20^{th}$ cycle of an all-solid Lithium-Sulfur battery using a positive active material, which is manufactured in Example 1 through the heating step at 500° C.

FIG. 5 shows measurement data of charging and discharging capacity up to $20^{th}$ cycle of the all-solid Lithium-Sulfur battery using the positive active material, which is manufactured in Example 1 through the heating step at 500° C. Referring to FIG. 5, it can be found that the all-solid Lithium-Sulfur battery used in Measuring Example 3 shows enough life time characteristic to be commercially available because it shows electric efficiency (Coulombic efficiency) of 99.9% or more even after 20 cycles of charging and discharging.

To sum up, the present disclosure has technical characteristics of manufacturing the lithium sulfide-carbon fiber composite by mixing the lithium sulfide dissolved in the anhydrous ethanol and the carbon fiber, vacuum drying thereof to evaporate the anhydrous ethanol, to make the lithium sulfide to be deposited on the carbon fiber, and manufacturing the positive active material by heating the composite at 400 to 600°.

The deposited amorphous lithium sulfide is phase transitioned to the nano-sized crystal form of 70 to 100 nm while passing through the heating step, and the lithium sulfide is obtained with high yield and evenly formed to the carbon fiber phase when comparing to the existing powder grinding process.

Further, charging and discharging capacity can be improved because the lithium sulfide has a nano size, and therefore contact with the electrolyte is smoother than the existing positive electrode for a secondary battery, and battery life time can be improved because the influence by volume change of the positive electrode is relieved during charging and discharging of the all-solid battery due to the small size of the lithium sulfide.

Examples 2 and 3—Positive Electrode Manufactured with Different Content Ratio of Lithium Sulfide, Carbon Fiber and Conductive Material The procedure of Example 1 was repeated except for using the positive electrode having the content ratio of lithium sulfide, carbon fiber, and conductive material as shown in the following Table 4 to manufacture an all-solid battery.

TABLE 4

|  | Lithium Sulfide | Carbon Fiber | Conductive Material | Solid Electrolyte |
|---|---|---|---|---|
| Example 2 | 1 | 0.2 | 0.2 | 2 |
| Example 3 | 1 | 0.1 | 0.2 | 2 |
| Total Weight of Positive Electrode | | 15 mg | | |

Measuring Example 4—Measurement of Charging and Discharging Characteristics of All-Solid Lithium-Sulfur Battery Manufactured by Examples 2 and 3

Figure 6:
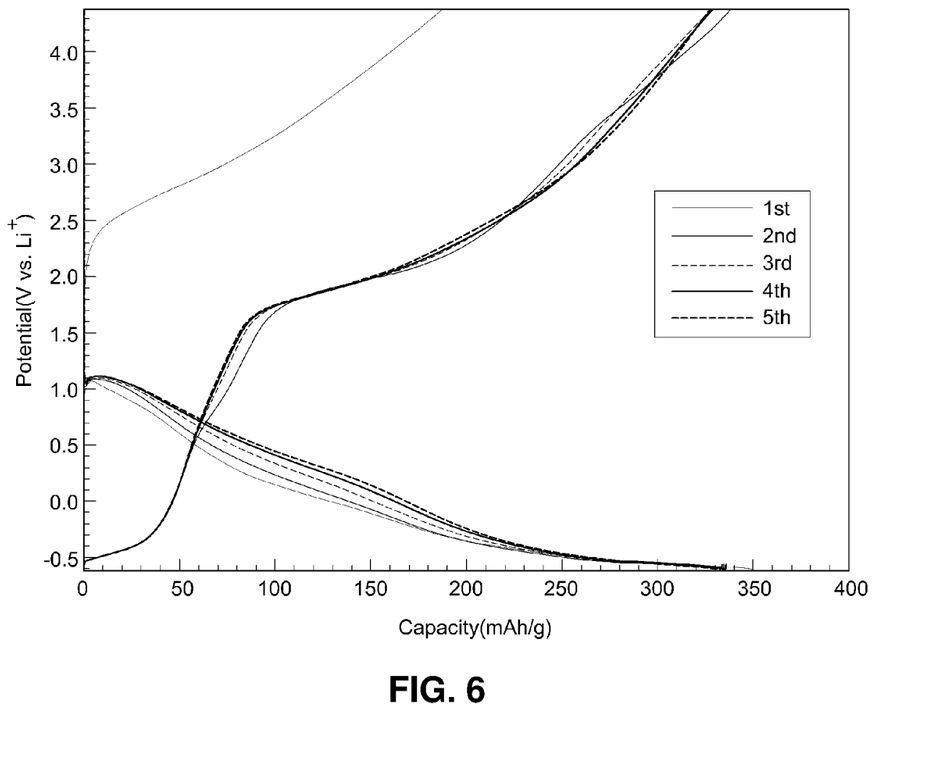
FIG. 6 shows measurement data of charging and discharging characteristics of an all-solid Lithium-Sulfur battery manufactured by Example 2.
Figure 7:
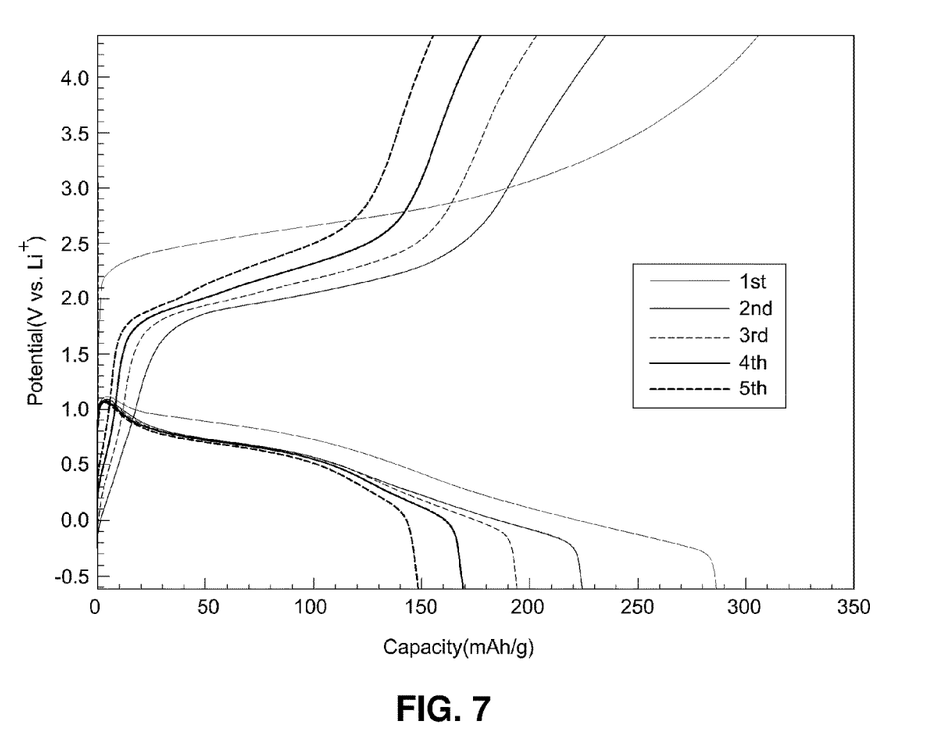
FIG. 7 shows measurement data of charging and discharging characteristics of an all-solid Lithium-Sulfur battery manufactured by Example 3.

FIGS. 6 and 7 are graphs showing measurement data of charging and discharging characteristics of the all-solid Lithium-Sulfur batteries manufactured in Example 2 and Example 3, respectively. It can be confirmed from FIGS. 6 and 7 that charging and discharging capacity of 350 mAh/g in Example 2 is improved about 17%, as compared to Example 3.

When the lithium sulfide, the carbon fiber and the conductive material are mixed at ratio of 1:0.2:0.2, the carbon fiber which is in line-contact with the lithium sulfide and the conductive material which is in point-contact with the lithium sulfide, effectively contact with the lithium sulfide, thereby maximizing conductivity in the positive electrode. Thus, charging and discharging capacity may be further improved.

The present disclosure as described above has the following effects.

The method for manufacturing a positive active material for an all-solid Lithium-Sulfur battery of the present disclosure improves the life time characteristic because the influence by volume change during charging and discharging of the battery is relieved.

Further, the method for manufacturing a positive active material for an all-solid Lithium-Sulfur battery of the present disclosure can increase battery capacity because contact characteristic between the conductive material and the active material is improved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a positive active material for an all-solid Lithium-Sulfur battery, the method comprising steps of:
   (1) preparing a lithium sulfide ($Li_2S$) solution by dissolving lithium sulfide in anhydrous ethanol;
   (2) preparing a mixture by mixing a carbon fiber to the lithium sulfide solution;
   (3) preparing a lithium sulfide-carbon fiber composite by drying the mixture of the carbon fiber and the lithium sulfide solution to deposit the dissolved lithium sulfide on a surface of the carbon fiber;
   (4) heating the lithium sulfide-carbon fiber composite at 400 to 600° C.; and
   (5) mixing a conductive material to the lithium sulfide-carbon fiber composite,
   wherein the mixing ratio of the lithium sulfide:the carbon fiber:the conductive material is 1:0.2:0.2,
   wherein a powder size of the lithium sulfide in the lithium sulfide-carbon fiber composite after step (4) is 70 to 100 nm.

2. The method of claim 1, wherein the heating in step (4) is conducted at 500° C.

3. The method of claim 1, wherein the drying in step (3) is conducted in a vacuum.

4. The method of claim 1, wherein the conductive material includes Ketjen black, Acetylene black, Super P, and the like.

5. The method of claim 1, wherein the carbon fiber includes a vapor-grown carbon fiber (VGCF), a carbon nanotube (CNT), and the like.

* * * * *